Aug. 22, 1961

A. ARMEN ET AL 2,997,449
ACRYLONITRILE POLYMER COMPOSITIONS CONTAINING
N-VINYL-3-MORPHOLINONE POLYMER DYE-ASSISTING
ADJUVANTS, METHOD OF MANUFACTURING SAME
AND RESULTING SHAPED ARTICLES
Filed Jan. 24, 1958

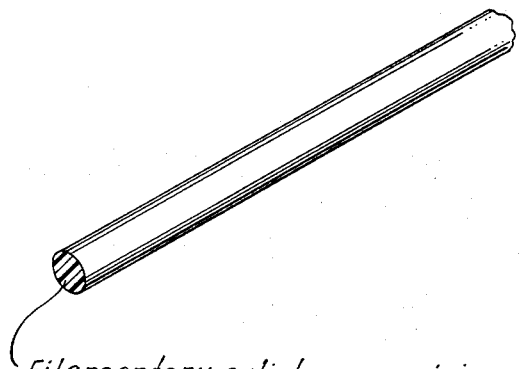

Filamentary article comprising an acrylonitrile polymer in which there is intimately incorporated a minor proportion of an N-vinyl-3-morpholinone polymer as a dye-assisting adjuvant.

INVENTORS.
Ardy Armen
Forrest A. Ehlers
Stanley A. Murdock
BY Griswold & Burdick
ATTORNEYS › # United States Patent Office 2,997,449
Patented Aug. 22, 1961

2,997,449
ACRYLONITRILE POLYMER COMPOSITIONS CONTAINING N-VINYL-3-MORPHOLINONE POLYMER DYE-ASSISTING ADJUVANTS, METHOD OF MANUFACTURING SAME AND RESULTING SHAPED ARTICLES
Ardy Armen, Concord, Forrest A. Ehlers, Walnut Creek, and Stanley A. Murdock, Concord, Calif., assignors to The Dow Chemical Company, Midland, Mich., a corporation of Delaware
Filed Jan. 24, 1958, Ser. No. 710,912
18 Claims. (Cl. 260—29.6)

The limited dyeability of polyacrylonitrile is a generally recognized characteristic that may be responsible for many difficulties and may even engender dissatisfactory results when the polymer is employed for the fabrication of various shaped articles including filaments, fibers, films and the like. As a consequence, there may not always be available or it may not always be possible to provide a satisfactorily wide range or choice of colors and shades in the cloth, fabric and other textile materials that are constructed from filamentous articles or in other shaped articles comprised of various polymers of acrylonitrile, the conventional varieties of which are frequently referred to and characterized as being "acrylic" fibers.

Many techniques and procedures have been employed, suggested and proposed for ameliorating the dye-receptivity of acrylonitrile polymer fibers. By way of specific illustration, the use of certain polymers of various heterocyclic nitrogen-containing monomers has been disclosed as one means for accomplishing the desired purpose in U.S. Patent No. 2,643,990. U.S. Patent No. 2,790,783 is also concerned with such subject matter.

Certain of the heterocyclic nitrogen-containing materials, particularly many of the N-vinyl lactam polymers and especially certain varieties of poly-N-vinyl-2-pyrrolidone are specially beneficial agents for improving the dyeability of polymer blended acrylonitrile polymer fiber compositions in which they may be incorporated. Such materials, however, are generally relatively expensive substances for employment as dye-assisting adjuvants.

It would be desirable, therefore, and especially advantageous, to provide new and highly effective dye-assisting adjuvants for fiber-forming compositions and the filamentous articles resulting therefrom comprised of the essentially linear, fiber-forming acrylonitrile polymers, particularly polyacrylonitrile. It would be especially beneficial if new dye-assisting adjuvants having eminently satisfactory properties for the purpose could be provided on a relatively economical basis, especially if such adjuvants would have a high capacity for multifarious dyestuffs and generally acceptable dye-receptive characteristics while permitting the acrylonitrile polymers in which they are employed to retain their desirable fiber-forming properties and other characteristics in a substantially unaltered and undiminished manner. In ancillary relationship to such desiderata, it would also be advantageous if minimized quantities of such novel dye-assisting adjuvants were required to be incorporated in such compositions in order that they might have such a high capacity for dyestuffs as to attain for them a level of dye-receptivity or dyeability that would easily meet or exceed the requirements for general commercial acceptances as a suitable, readily dyeable fiber. Additional advantage and desirability would be found in the provision of a facile and improved method for the preparation of readily dyeable and excellent fiber-forming acrylonitrile polymer compositions, particularly polyacrylonitrile compositions, with the novel dye-assisting adjuvants of the present invention being incorporated therein in order to facilitate the manufacture and fabrication of dyeable, high quality acrylonitrile polymer fibers and the like.

This invention has reference to, and has among its principal objectives, the accomplishment of the foregoing advantages and desiderations and the provision of other salutary benefits.

According to the invention, acrylonitrile polymer compositions having good fiber-forming properties and excellent characteristics of dye-receptivity are comprised of and may be provided with a fiber-forming acrylonitrile polymer in which there is incorporated, as a dye-assisting adjuvant, a minor proportion of a polymer of N-vinyl-3-morpholinone or its ring-substituted derivatives, particularly its monomethyl and monoethyl ring-substituted homologues. Great advantage may be achieved when homopolymers of N-vinyl-morpholinones, such as homopolymeric poly-N-vinyl-3-morpholinone, are employed in the practice of the invention. It is usually of greater benefit when the N-vinyl-3-morpholinone polymer that is employed has a relatively high molecular weight, such as one that has been initially formed as a polymeric substance having a Fikentscher K-value of at least about 10, and, more advantageously, from about 40 to 75–100 or higher. Acrylonitrile polymer fiber products, as illustrated by the schematic representation of a filamentous article in the sole figure of the accompanying drawing, may advantageously be fabricated from such compositions.

The acrylonitrile polymer fiber products in accordance with the present invention have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes. Such varied and representative dyestuffs, by way of didactic illustration, as Calcocid Alizarine Violet (Color Index 61710, formerly Color Index 1080), Sulfanthrene Red 3B (Color Index Vat Violet 2), Amacel Scarlet GB (Color Index Direct Red 1, also American Prototype Number 244), Calcodur Pink 2BL (Color Index 353, also more recently, Color Index Direct Red 75), Naphthol ASMX (Color Index 35527) and Fast Red TRN Salt (Color Index Azoic Diazo Component 11), and Immedial Bordeaux G (Color Index Sulfur Brown 12) may be advantageously employed for such purposes.

Other dyestuffs, by way of further illustration, that may be utilized beneficially on the N-vinyl-3-morpholinone polymer-containing acrylonitrile polymer fiber products of the invention include such direct cotton dyes as Chlorantine Fast Green 5BLL (Color Index Direct Green 27), Chlorantine Fast Red 7B (Color Index Direct Red 81), Pontamine Green GX Conc. 125 percent (Color Index Direct Green 6), Calcomine Black EXN Conc. (Color Index Direct Black 38), Niagara Blue NR (Color Index Direct Blue 151) and Erie Fast Scarlet 4BA (Color Index Direct Red 24); such acid dyes as Anthraquinone Green GN (Color Index Acid Green 25), Sulfonine Brown 2R (Color Index Acid Orange 51), Sulfonine Yellow 2G (Color Index Acid Yellow 40), Xylene Milling Black 2B (Color Index Acid Black 26A), Xylene Milling Blue FF (Color Index Acid Blue 61), Xylene Fast Rubine 3GP PAT (Color Index Acid Red 57), Calcocid Navy Blue R Conc. (Color Index Acid Blue 120), Calcocid Fast Blue BL (Color Index Fast Blue 59), Calcocid Milling Red 3R (Color Index Acid Red 151), Alizarine Levelling Blue 2R (Color Index Acid Blue 51), Amacid Azo Yellow G Extra (Color Index Acid Yellow 63); such mordant-acid dyes as Alizarine Light Green GS (Color Index Acid Green 25); such basic dyes as Brilliant Green Crystals (Color Index Basic Green 1), and Rhodamine B Extra S (Color Index Vat Blue 35); such vat dyestuffs as Midland Vat Blue R Powder (Color Index Vat Blue 35), Sulfanthrene Brown G Paste (Color Index Vat Brown 5), Sulfanthrene Blue 2B Dbl. paste (Color Index Vat Blue 5), and Sulfanthrene Red 3B paste (Color Index Vat Violet 2) as well as certain soluble vat dyestuffs; such acetate dyes as Celliton Fast Brown 3RA Extra CF (Color Index Dispersed Orange 5), Celliton Fast Rubine BA CF (Color Index Dispersed Red 13), Artisil Direct Red 3BP and Celanthrene Red 3BN Conc. (both Color Index Dispersed Red 15), Celanthrene Pure Blue BRS 400 percent (Color Index Dispersed Blue 1) and Acetamine Yellow N (Color Index Dispersed Yellow 32); B-Naphthol←2-chloro-4-nitroaniline, an azoic dye; such sulfur dyes as Katigen Brilliant Blue GGS High Conc. (Color Index Sulf. Blue 9) and Indo Carbon CLGS (Color Index Sulf. Blue 6"; and premetallized dyestuffs.

The dyed products are generally lightfast and are well imbued with a resistance to crocking. In addition, the dyed products exhibit good washfastness and retain the dye-assisting N-vinyl-3-morpholinone polymer adjuvant in a substantially permanent manner despite repeated exposure to washing, laundering and dry cleaning treatments. In addition, by virtue of the intrinsic hydrophilic character of the polymer, its incorporation in fibers and other shaped acrylonitrile polymer articles tends, in general, to benefit their antistatic properties.

It is greatly preferred to characterize N-vinyl-3-morpholinone polymer-containing acrylonitrile polymer textile fibers as being members of the "nitrile alloy" class of fibers in order to clearly distinguish them from the conventional prototype acrylonitrile polymer fibers, including the ordinary copolymeric varieties, that are known to the art and which, as has been indicated, are oftentimes referred to and known as "acrylic" fibers.

Exceptional benefit may be realized when the compositions are comprised of and prepared with (1) fiber-forming polyacrylonitrile and (2) the homopolymer of N-vinyl-3-morpholinone or its monomethyl or monoethyl ring substituted homologues. The N-vinyl-3-morpholinone polymers that are employed may, of course, be copolymers with various other monomeric materials, especially those that contain predominant quantities of the N-vinyl-3-morpholinone monomer polymerized therein. Preferably, however, as has been indicated, homopolymers are employed as the dye-assisting adjuvants in the practice of the invention. If desired, the fiber-forming acrylonitrile polymers that may be utilized may be comprised of various copolymers of acrylonitrile and other ethenoid monomers, well known to those familiar with the art, that contain in the polymer molecule at least about 80 percent by weight of acrylonitrile polymerized therein. As is apparent, acrylonitrile copolymers that have little or no capacity for dyestuffs and which may be difficult or troublesome to dye may be particularly benefited by practice of the invention. Likewise, as has been indicated, such copolymers of N-vinyl-3-morpholinone or its various homologous derivatives with other monomers, such as copolymers of N-vinyl-3-morpholinone and vinyl pyridine; N-vinyl-3-morpholinone and vinyl acetate; N-vinyl-3-morpholinone and acrylic acid; and N-vinyl-3-morpholinone and styrene sulfonic acid and the like that contain predominant proportions of the N-vinyl-3-morpholinone monomer polymerized in the copolymer molecule may also be utilized as dye-assisting adjuvants. If an N-vinyl-3-morpholinone copolymer is employed, the greatest benefit may generally be derived when it contains at least about 75 percent by weight of the N-vinyl-3-morpholinone monomer, preferably unsubstituted N-vinyl-3-morpholinone or its monomethyl or monoethyl ring substituted homologues, polymerized in the copolymer molecule. In certain instances, however, a suitable copolymer may be obtained with as little as 50 percent by weight of the N-vinyl-3-morpholinone monomer polymerized therein.

If desired, the fiber-forming composition may comprise as much as 20 or more percent by weight of the N-vinyl-3-morpholinone polymer based on the weight of the composition. Usually, however, suitable dye-receptivity and better fiber-forming properties may be achieved with lesser proportions of the dye-assisting adjuvant incorporated in the composition. An appreciable improvement in dye-receptivity may frequently be obtained when a quantity of the N-vinyl-3-morpholinone polymer that is less than one percent by weight is employed. Advantageously, an amount between about 3 and 15 or so percent by weight of the N-vinyl-3-morpholinone polymer may be utilized in the composition. Greater advantages may often accrue when the amount of the N-vinyl-3-morpholinone polymer that is incorporated in the composition is in the neighborhood of 5–8 percent, by weight, based on the weight of the composition. A fiber-forming acrylonitrile polymer composition which, in accordance with the present invention, contains any given proportion of an N-vinyl-3-morpholinone polymer, particularly poly-N-vinyl-3-morpholinone or homopolymers of its monomethyl and monoethyl ring substituted homologues, and particularly one that has been initially formed to have a Fikentscher K-value greater than about 10, especially one having a K-value in excess of 40, may be observed to have a marked and significantly increased dye-receptivity.

It is generally possible in the practice of the invention, for example, by employing from 5 to 8 percent by weight of a dye-assisting N-vinyl-3-morpholinone polymer adjuvant, to prepare an acrylonitrile polymer-containing composition having such an increased dye-receptivity that a color differential of at least about 25, and frequently more than 50 Judd units may be readily obtained between samples of the undyed composition and samples that have been dyed at a 4 percent dyeing, according to conventional techniques, with such a dyestuff as Calcodur Pink 2BL (Color Index 353). As will be appreciated by those who are skilled in the art, a calculated numerical value, given in Judd units, is an indication of the amount of color difference between samples of the same fiber in a dyed and undyed condition as may be determined by a reflectance method using the entire visible spectrum from a standard light source and a photoelectric measuring means to indicate the amount of reflected light obtained with a given sample and exposed to the light source. A greater numerical value of Judd units, which are frequently used in the art for measuring color differentials, is an indication of less reflectance and better dye-receptivity and retention in a given sample of dyed fibers. An increase in dye-receptivity that is measurable (as indicated) by a color differential of 25 or more Judd units is generally more than adequate to secure commercial acceptance of the particular article involved as one that may be characterized as being a readily dyeable product.

The N-vinyl-3-morpholinone polymers that are so advantageously employed in the practice of the present invention, particularly poly-N-vinyl-3-morpholinone and its monomethyl and monoethyl ring substituted homologues, are obtained by polymerizing the monomeric N-vinyl-3-morpholinone under the influence of a free radical generating catalyst either in bulk or solution or by thermal polymerization in accordance with the method that is disclosed in the copending application of Billy E. Burgert, entitled "N-Vinyl-3-Morpholinone Compounds," having Serial No. 692,587 that was filed on October 28, 1957. Such a method of preparation quite readily can be conducted to result in obtaining polymers that are initially formed having Fikentscher K-values much greater than 10 to as high as 75–100 or more. The Fikentscher K-value of a polymeric substance is a quantity, as has been defined by Fikentscher in Cellulose chemie, 13, 60 (1932), that represents an approximate measure of the weight fraction of a given sample of polymer in an infinitesimal molecular weight range. According to a concept that is widely acceptable to those skilled in the art, it may be said to be in correlation, in an exponential manner, to the mean average molecular weight that obtains in a given sample of a polymer substance.

The N-vinyl-3-morpholinone polymers that are utilized in the practice of the present invention, especially when they have been derived from unsubstituted N-vinyl-3-morpholinone, have as an essential constituent of their polymeric structure, characterizing proportions of the recurring group:

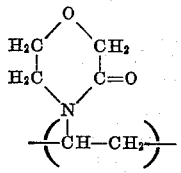

Of course, as has been indicated, the homologous polymers that may beneficially be employed as dye-assisting adjuvants in the practice of the invention may also be derived from substituted N-vinyl-3-morpholinone monomers of the structure:

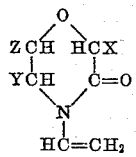

in which each of the X, Y and Z substituents can independently be either hydrogen or alkyl substituents containing from 1 to about 4 carbon atoms with the limitation that at least one of them must be alkyl. Typical of such substituted monomers from which satisfactory polymers and copolymers may be derived may be mentioned N-vinyl-5-methyl-3-morpholinone; N-vinyl-5-ethyl-3-morpholinone and equivalent 2- or 6-substituted derivatives as well as like derivatives with plural ring substituted alkyl groups.

The dye-assisting N-vinyl-3-morpholinone polymer adjuvants may be incorporated in the fiber-forming acrylonitrile polymer compositions according to various techniques. For example, the N-vinyl-3-morpholinone polymer and the acrylonitrile polymer may be directly blended in order to provide the composition which, incidentally, may be used for any desired fabrication purpose in addition to that which is usually contemplated for fiber-forming compositions. Beneficially, the polymers may be comminuted, either separately or in combination, before being intimately blended together by mechanical or other means. The blended polymers may be prepared into suitable fiber-forming systems by dispersing or dissolving them in a suitable liquid medium. Or, compositions may be provided in fiber-forming substances by sequentially dissolving or dispersing the polymers in any desired order in a suitable medium, as by incorporating the N-vinyl-3-morpholinone in a prepared acrylonitrile polymer spinning solution, dope or the like fiber-forming compositions.

A highly advantageous technique for providing the compositions, particularly when acrylic fiber products are involved, is to apply or impregnate the N-vinyl-3-morpholinone polymer from an aqueous dispersion or from solution in an aqueous solvent medium to a shaped acrylonitrile polymer article that is in an aquagel condition in a manner that is analogous to the technique employed for the application of vinyl lactam polymers in accordance with the disclosure of the copending application of George W. Stanton, Theodore B. Lefferdink, Richard W. Meikle and Mary J. Charlesworth for "A Method and Composition for Rendering Polyacrylonitrile Readily Dyeable," having Serial No. 333,385 which was filed on January 26, 1953. Thus, an acrylonitrile polymer filamentary article that has been spun from an aqueous saline spinning solution may be conveniently passed, after its coagulation and while it is in an aquagel condition through an aqueous bath containing a dissolved or dispersed N-vinyl-3-morpholinone polymer, such as poly-N-vinyl-3-morpholinone or its homologous monomethyl or monoethyl ring substituted derivatives in order to impregnate the filament with the dye-assisting adjuvant and provide a composition and an article in accordance with the invention.

The dye-receptive compositions of the invention may advantageously be utilized in fiber-forming systems of any desired type in order to be spun into fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be and commonly are manufactured from synthetic or artificial polymeric and resinous materials. It is frequently desirable to employ concentrated solutions of salts or mixtures of salts as the dispersing or dissolving media for such purposes. Such solutions may, for example, contain at least about 55 percent by weight, based on the weight of the solution, of zinc chloride or equivalent saline solvents for the polymer. Fiber products in accordance with the invention that are spun from saline fiber-forming systems may, by way of further illustration, be coagulated in more dilute saline solutions of a like or similar nature and may then be processed after coagulation according to the conventional techniques of washing, stretching, drying, finishing and the like.

The invention is further illustrated in and by the following examples wherein, unless otherwise indicated, all parts and percentages are to be taken by weight.

*Example 1*

A spinning solution comprised of about 10 parts of polyacrylonitrile dissolved in about 90 parts of a 60 percent aqueous solution of zinc chloride was extruded through a spinnerette having 750 orifices, each having a diameter of about 0.006 inch, into an aqueous coagulating bath that contained about 42 percent by weight of zinc chloride dissolved therein to be spun into a multiple filament tow. The coagulated tow was washed substantially free from salt after being withdrawn from the coagulating bath and collected.

About 1 gram (on a dry weight basis) of the aquagel fiber was immersed in about 12 milliliters of an aqueous solution of poly-N-vinyl-3-morpholinone containing about 5.0 percent of the polymer. The applicating solution was maintained at a temperature between 95 and 100° C. during the impregnation. The poly-N-vinyl-3-morpholinone that was employed had a Fikentscher K-value of about 38. It had been prepared by homopolymerization of the monomer in aqueous solution. After being impregnated for about 10 minutes, the polyacrylonitrile fiber was removed from the impregnating bath and dried at a temperature of about 150° C. for 15 minutes.

A portion of the impregnated polyacrylonitrile fiber sample containing the poly-N-vinyl-3-morpholinone was dyed with 4 percent Calcodur Pink 2BL for about one hour at the boil in a sodium sulfate-containing bath according to conventional procedure in which the dyestuff was present in the bath in an amount equal to about 4 percent of the weight of the fiber, the sodium sulfate was present in the bath in an amount equal to about 15 percent of the weight of the fiber and the weight ratio of bath to fiber was about 30:1. The dyed sample was then rinsed in water and dried for about 20 minutes at 80° C. The dye receptivity of the fiber was evaluated by spectrophotometrically measuring the amount of monochromatic light having a wave length of about 520 millimicrons from a standard source that was reflected from the sample dyed with 4 percent Calcodur Pink 2BL. A numerical reflectance value was thereby obtained which represented the relative comparison of the amount of light that was reflected from the dyed sample with that which was reflected from a standard white tile reflector having an arbitrarily assigned reflectance value of 316.

Lower reflectance values are an indication of better dye-receptivity in the fiber. For example, a reflectance value of about 25 for polyacrylonitrile fibers dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. The dyed polyacrylonitrile fiber sample containing the poly-N-vinyl-3-morpholinone in accordance with the invention had a reflectance value of about 9. They had taken on the dye with a deep and level shade of coloration.

*Example 2*

About 10.0 grams of monomeric N-vinyl-3-morpholinone; 40.0 grams of water; and 0.1 gram of azobisisobutyronitrile were charged together into a suitable reaction flask. The pH of the resulting mixture was about 6.5. The charge was polymerized for about 16 hours at a temperature of about 50° C. The monomer was completely converted to a water-soluble polymer having a reduced viscosity of about 1.00, taken at 25° C. at a concentration of 0.878 gram of the poly-N-vinyl-3-morpholinone in 100 milliliters of water. The Fikentscher K-value of the polymer was about 62.

Following the general procedure of the first example, the thereby obtained poly-N-vinyl-3-morpholinone product was impregnated into a polyacrylonitrile aquagel fiber that had been extruded from a 10 percent spinning solution of the polyacrylonitrile dissolved in 60 percent aqueous zinc chloride; coagulated; washed with water; and given about a 14.3:1 cold stretch before entering the impregnation stages. The impregnation was performed as part of a three-stage hot stretching operation in which the aquagel fiber was further elongated for orientation while being drawn through three consecutive boiling water baths, the last two of which were aqueous solutions of the poly-N-vinyl-3-morpholinone impreganant. The first hot stretch stage was essentially pure boiling water wherein a stretch ratio of about 5.2:1 was effected on the fiber. In the second stage, a stretch ratio of about 1.5:1 was employed while the fiber was being passed through a 1.3 percent aqueous solution of the poly-N-vinyl-3-morpholinone at the boil. In the last stage, also maintained at the boil, the stretch ratio was about 1.2:1 and the concentration of the dissolved polymeric impregnant about 0.2 percent.

After the impregnation, the fiber was dried for 15 minutes at 150° C. The impregnated fiber product was found to contain about 3.5 percent by weight, based on the weight of the fiber, of the poly-N-vinyl-3-morpholinone impregnant. It had an attractive white appearance with the following properties:

| | |
|---|---|
| Denier | 2.5 |
| Tenacity, grams/denier | 4.3 |
| Elongation, percent | 29 |
| Dry yield, grams/denier | 1.13 |
| Wet yield, grams/denier | 1.00 |

Its general dye-receptivity was excellent. Its reflectance value, upon a 4 percent dyeing with Calcodur Pink 2BL, was about 20. Its lightfastness and colorfastness in the dyed condition was found to be very good. Its washfastness, as determined by A.A.T.C.C. standards, was entirely acceptable, rating 5 (the best possible) for sulfur and vat dyestuffs; 4 for direct and naphthol dyestuffs; 3 for neutral premetallized acid dyestuffs; and 2 for basic dyestuffs.

*Example 3*

When acrylonitrile polymer fibers are impregnated to 5.8 percent by weight levels with poly-N-vinyl-3-morpholinone and dyed in the conventional manner with 4 percent Calcodur Pink 2BL, the improvement in dye-receptivity of the fiber invariably is such that at least 25 Judd units color differential can generally be obtained between the dyed impregnated samples and the samples of the same fiber in an undyed condition. Frequently more than 50 Judd units of color difference can be easily and readily secured in this manner, even when lesser quantities of the dye-assisting adjuvant of the present invention are utilized.

Similar excellent results may be obtained when other acrylonitrile polymer compositions, including the fiber-forming copolymers, and other shaped articles thereof are provided in accordance with the foregoing, or when any other means, such as direct blending, are utilized for incorporating varying proportions of the polymeric dye-assisting adjuvant, as well as adjuvants comprised of other N-vinyl-3-morpholinone polymers, such as copolymers of N-vinyl-3-morpholinone with other monomers copolymerizable therewith and polymers and copolymers of ring substituted (especially monomethyl and monoethyl substituted) homologous monomers in the composition and when the resulting dye-receptive articles are dyed with other varieties of dyestuffs, including any of those specific varieties that have been mentioned herein.

Certain changes and modifications in the practice of the present invention can be readily entered into without departing from its intended spirit and scope. Therefore, it is to be fully understood that the invention is not to be considered as being limited or in any way restricted to or by the preferred deictic embodiments thereof which are included in the foregoing description and specification. Rather, it is to be interpreted and construed in the light of what is set forth and defined in the hereto appended claims.

What is claimed is:

1. A dye-receptive composition comprising (1) a fiber-forming acrylonitrile polymer which is a polymer of polymerizable, acrylonitrile-containing, ethylenically unsaturated monomeric material that has in the polymer molecule at least about 80 weight percent of polymerized acrylonitrile, said composition uniformly containing therein (2) up to about 20 percent by weight, based on the weight of the composition, of an N-vinyl-3-morpholinone polymer.

2. The dye-receptive composition of claim 1, wherein said N-vinyl-3-morpholinone polymer has initially been formed as a polymeric substance having a Fikentscher K-value of between about 10 and about 100.

3. The composition of claim 2, wherein the acrylonitrile polymer is polyacrylonitrile.

4. The composition of claim 2, wherein the N-vinyl-3-morpholinone polymer is a homopolymer.

5. The composition of claim 2, wherein the N-vinyl-3-morpholinone polymer is poly-N-vinyl-3-morpholinone.

6. The composition of claim 2, wherein the N-vinyl-3-morpholinone polymer is incorporated in the composition in an amount between about 3 and 15 percent, based on the weight of the composition.

7. A composition in accordance with the composition set forth in claim 6 and being further characterized by having a dye-receptivity to a Color Index 353 dyestuff at a 4 percent dyeing that is indicated and measurable by its having a color differential of at least about 25 Judd units between the composition in a dyed and an undyed condition.

8. A shaped article comprised of the composition set forth in claim 1.

9. A shaped article comprised of the composition set forth in claim 2.

10. A filamentous article comprised of the composition set forth in claim 2.

11. Method for materially increasing the dye-receptivity of compositions of (1) a fiber-forming acrylonitrile polymer which is a polymer of polymerizable, acrylonitrile-containing, ethylenically unsaturated monomeric material that has in the polymer molecule at least about 80 weight percent of polymerized acrylonitrile, which method comprises uniformly physically incorporating therein (2) a minor proportion of up to about 20 percent by weight, based on the weight of the resulting composition of an N-vinyl-3-morpholinone polymer.

12. The method of claim 11, wherein the acrylonitrile polymer is polyacrylonitrile.

13. The method of claim 11, wherein the N-vinyl-3-morpholinone polymer is a homopolymer.

14. The method of claim 11, wherein the N-vinyl-3-morpholinone polymer is poly-N-vinyl-3-morpholinone.

15. In the method of claim 11, incorporating the N-vinyl-3-morpholinone polymer in the composition by mechanical blending.

16. In the method of claim 11, incorporating the N-vinyl-3-morpholinone polymer in the composition by dispersing it in a spinning composition of the acrylonitrile polymer.

17. In the method of claim 11, incorporating the N-vinyl-3-morpholinone polymer in the composition by applying it from an aqueous solution while the acrylonitrile polymer is in an aquagel form.

18. A method in accordance with the method set forth in claim 17, wherein said acrylonitrile polymer is polyacrylonitrile.

References Cited in the file of this patent

UNITED STATES PATENTS 2,818,398     Cleverdon _____ Dec. 31, 1957